US008145747B2

(12) United States Patent
Epling

(10) Patent No.: US 8,145,747 B2
(45) Date of Patent: Mar. 27, 2012

(54) WEBPAGE DOMAIN MONITORING

(75) Inventor: Jeremiah S Epling, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 246 days.

(21) Appl. No.: 11/953,890

(22) Filed: Dec. 11, 2007

(65) Prior Publication Data
US 2009/0150539 A1 Jun. 11, 2009

(51) Int. Cl.
G06F 15/173 (2006.01)

(52) U.S. Cl. ......... 709/224; 709/201; 709/202; 709/203

(58) Field of Classification Search ............... 709/224
See application file for complete search history.

(56) References Cited

U.S. PATENT DOCUMENTS

| 6,018,619 | A | 1/2000 | Allard et al. | |
|---|---|---|---|---|
| 6,112,240 | A | 8/2000 | Pogue et al. | |
| 6,687,740 | B1* | 2/2004 | Gough et al. | 709/206 |
| 6,795,856 | B1 | 9/2004 | Bunch | |
| 6,973,580 | B1* | 12/2005 | Carroll et al. | 709/203 |
| 7,103,657 | B1 | 9/2006 | Mariani et al. | |
| 2002/0133720 | A1* | 9/2002 | Sherman et al. | 709/217 |
| 2003/0046385 | A1 | 3/2003 | Vincent | |
| 2004/0015580 | A1 | 1/2004 | Lu et al. | |
| 2004/0078422 | A1 | 4/2004 | Toomey | |
| 2004/0243704 | A1* | 12/2004 | Botelho et al. | 709/224 |
| 2006/0075122 | A1* | 4/2006 | Lindskog et al. | 709/228 |
| 2006/0106866 | A1 | 5/2006 | Green et al. | |
| 2006/0136985 | A1* | 6/2006 | Ashley et al. | 726/1 |
| 2006/0271669 | A1 | 11/2006 | Bouguenon et al. | |
| 2006/0294052 | A1 | 12/2006 | Kulkami et al. | |
| 2007/0055642 | A1 | 3/2007 | Kim et al. | |
| 2007/0180523 | A1 | 8/2007 | Jablonski et al. | |
| 2008/0134084 | A1* | 6/2008 | Clark et al. | 709/206 |

FOREIGN PATENT DOCUMENTS

| JP | 2002245003 | 8/2002 |
|---|---|---|
| KR | 20020084374 | 11/2002 |
| KR | 20040087205 | 10/2004 |

OTHER PUBLICATIONS

"Tracking & Website Usage Analysis", MJB Data, pp. 1-2.
"Traffic Analysis and Reporting", Receptional Internet Marketing, pp. 1-2.
Ding, et al., "Centralized Content-Based Web Filtering and Blocking: How Far Can It Go?", Proceedings of International conference on Systems, Man, and Cybernetics, IEEE SMC apos;99, vol. 2, 1999, pp. 5.
"PCT Search Report and Written Opinion", Application No. PCT/US2008/084549, (Mar. 10, 2010),11 pages.
"Foreign Office Action", Chinese Application No. 200880120709, (Oct. 20, 2011), 6 pages.
"Notification Prior to Examination", Israel Application No. 205199, (Nov. 14, 2011) 2 pages.

* cited by examiner

Primary Examiner — Dohm Chankong
Assistant Examiner — Neeraj Utreja

(57) ABSTRACT

Webpage domain monitoring is described. In an implementation, one or more web pages are obtained at a client, with each said web page including a plurality of content that is provided, respectively, via a plurality of domains. The plurality of domains that were used to provide the plurality of content is identified and a counter is incremented, respectively, for each identified domain. When the counter for a respective said domain exceeds a threshold, a notification is output by the client that indicates that the respective said domain has a likelihood of tracking the client.

19 Claims, 4 Drawing Sheets

WEBPAGE DOMAIN MONITORING

BACKGROUND

Web pages are utilized to provide a wide variety of content to users. For example, a user may access a sports website to obtain web pages that contain scores and updates on favorite teams, a weather website to receive a webpage that includes a local forecast, interact with a webpage to check email, and so on. Consequently, users' reliance on webpage interaction continues to increase along with the increase in these varieties of content.

In some instances, however, users may be unknowingly tracked by third parties that host content in the websites that are visited by the users. For example, this tracking may be used to derive browsing patterns of users which may then be later used to reconfigure the website itself, serve advertisements, serve as a basis for unsolicited email (e.g., spam), and so on. Additionally, this tracking may be performed across multiple websites, which may be used to correlate a user's content consumption between these multiple websites. Tracking may be undesirable to users that wish to achieve at least partial anonymity when interacting with these websites, such as to prevent spam and other undesirable uses of tracking information by the websites and/or the third parties.

SUMMARY

Webpage domain monitoring is described. In an implementation, one or more web pages are obtained at a client, with each said web page including a plurality of content that is provided, respectively, via a plurality of domains. The plurality of domains that were used to provide the plurality of content is identified and a counter is incremented, respectively, for each identified domain. When the counter for a respective said domain exceeds a threshold, a notification is output by the client that indicates that the respective said domain has a likelihood of tracking the client.

In another implementation, a client includes a privacy policy and one or more modules that are configured to ascertain that a web page obtained from a first domain is to include content from a second domain. Access to the content from the second domain is managed by the one or more modules based on whether the second domain has privacy practices that comply with the privacy policy.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
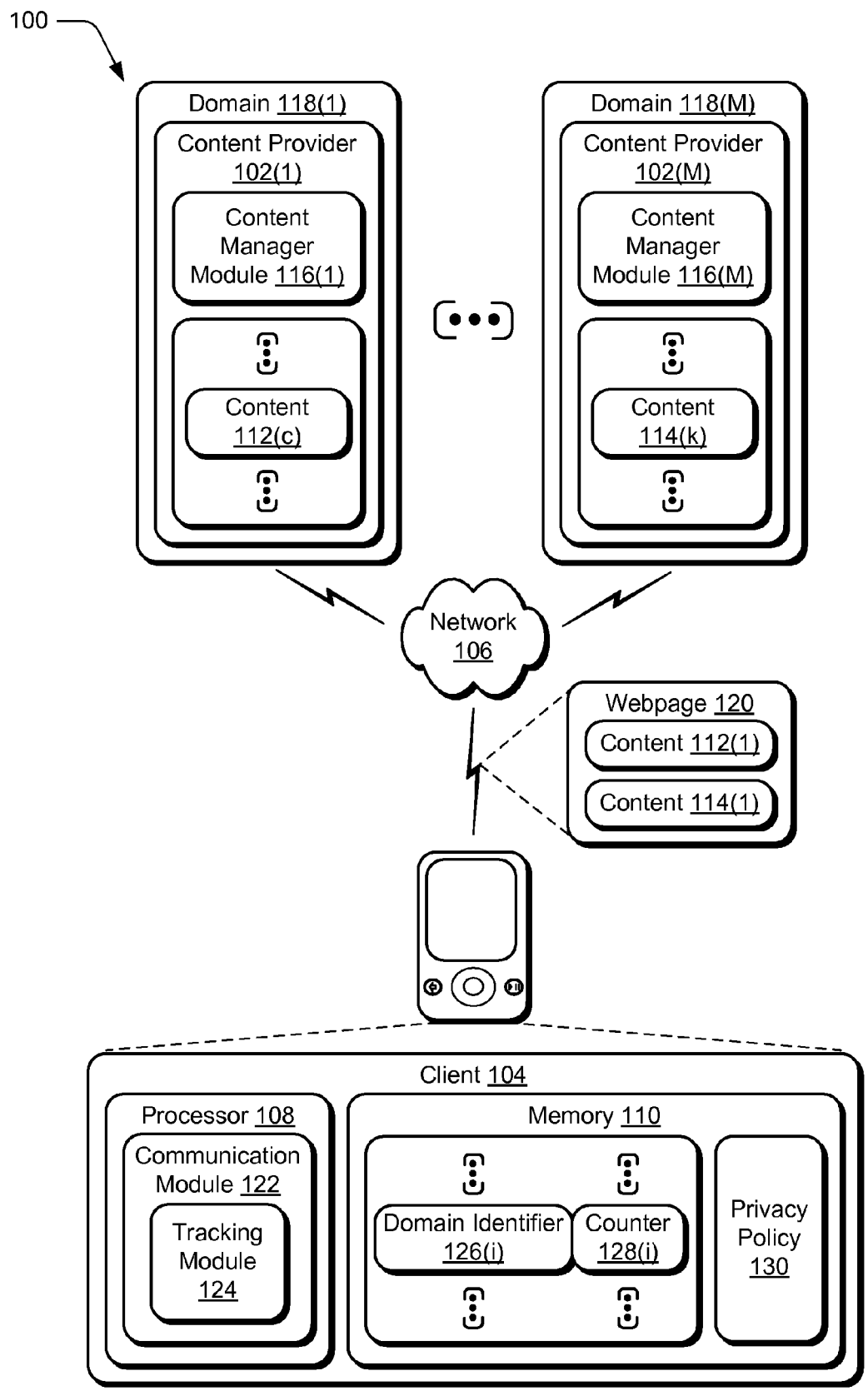
FIG. 1 is an illustration of an environment in an exemplary implementation that is operable to perform techniques to monitor webpage domains.

As previously discussed, users may access a variety of content via web pages. In some instances, however, a webpage may be obtained that contains content from a plurality of sources, such as a website hosting the page and another website that provides content to be included in the webpage. For example, a user may access a sports website that contains scores and articles on the sporting events that are occurring and/or are to occur that day. The sports website may also include advertisements that are provided by another source, such as an advertisement service. A third-party service that provides the "other" content (in the previous example the advertisement service), however, may use provision of this content to track the user, not only through that website but also across other websites that also obtain content from the third-party service, e.g., advertisements from the advertisement service. Tracking of the user may have a variety of detrimental effects, such as a perceived loss of privacy on the part of the user.

Webpage domain monitoring is described. In an implementation, techniques are employed to track particular domains that are used to provide content for a webpage, even when a webpage includes content from a plurality of domains. For example, a counter may be assigned to each domain that is used to supply content to web pages that are consumed at a client, even when multiple domains are used for a single webpage. When the counter exceeds a certain threshold (e.g., a predetermined number, in relation to the other counters as a whole such as when it exceeds five percent of the total counters), a notification is output that indicates that the domain that corresponds to the count has a likelihood of tracking the client. A variety of actions may then be taken based on this notification. For example, an option may be output to block subsequent content retrieval via that domain (e.g., through use of a blocked domain list), allow subsequent content retrieval, and so on, further discussion of which may be found in relation to FIG. 3.

In another implementation, client access to domains is managed based on whether privacy practices of the respective domains comply with a privacy policy of the client. For example, a privacy policy of the domain may be made available at a well-known location (e.g., within a specified network addresses within the domain itself, at a central repository available via the Internet, and so on) which may then be checked with the privacy policy of the client. When the privacy practices of the domain do not comply, a variety of actions may be undertaken. For example, future access to the domain may be blocked (e.g., through a "block list") or a "trade" may be performed such that the noncompliance of the domain is accepted in exchange for access to an additional feature of the domain, payment of a fee, and so on. Further discussion of privacy practices may be found in relation to FIG. 4.

In the following discussion, an exemplary environment is first described that is operable to perform webpage domain monitoring techniques. Exemplary procedures are then described that may be employed by the exemplary environment as well as other environments without departing from the spirit and scope thereof.

Exemplary Environment

FIG. 1 is an illustration of an environment 100 in an exemplary implementation that is operable to employ webpage domain monitoring. The illustrated environment 100 includes a plurality of content providers 102(1)-102(M) and a client 104 that are communicatively coupled, one to another, via a network 106. The client 104 may be configured in a variety of ways to access the network 106. For example, the client 104 may be configured as a computer that is capable of communicating over the network 106, such as a desktop computer, a mobile station, an entertainment appliance, a set-top box communicatively coupled to a display device, a wireless phone, a game console, and so forth. The client 104 may also relate to a person and/or entity that operates the client. In other words, client 104 may describe logical clients that include users and/or machines, e.g., a client device.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

Client 104 is illustrated in FIG. 1 as a client device that has a processor 108 and memory 110. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 110 is shown for the client 104, a wide variety of types and combinations of memory may be employed, such as random access memory (RAM), hard disk memory, removable medium memory, and other types of computer-readable media.

Content provider 102(1) and content provider 102(M) are illustrated as including respective content 112(c), 114(k), (where "c" and "k" may be any integer from one to "C" or "K", respectively) management of which is performed by respective content manager modules 116(1), 116(M). Further, each of the content provider 102(1), 102(M) is illustrated as being provided via different respective domains 118(1)-118(M). The domains 118(1)-118(M) in the environment 100 of FIG. 1 are configured in accordance with Uniform Resource Locator (URL) techniques, e.g., "www.firstcontentprovider.com" and "www.secondcontentprovider.com".

Content from the different content providers 102(1)-102(M), and consequently the different respective domains 118(1), 118(M) in this example may be provided together over the network 106 to the client 104. An instance of such provision is illustrated as webpage 120 which includes content 112(1) provided by content provider 102(1) via domain 118(1) and content 114(1) provided by content provider 102(M) via domain 118(M). The webpage 120 may take a variety of forms, an example of which is shown in relation to FIG. 2.

Figure 2:
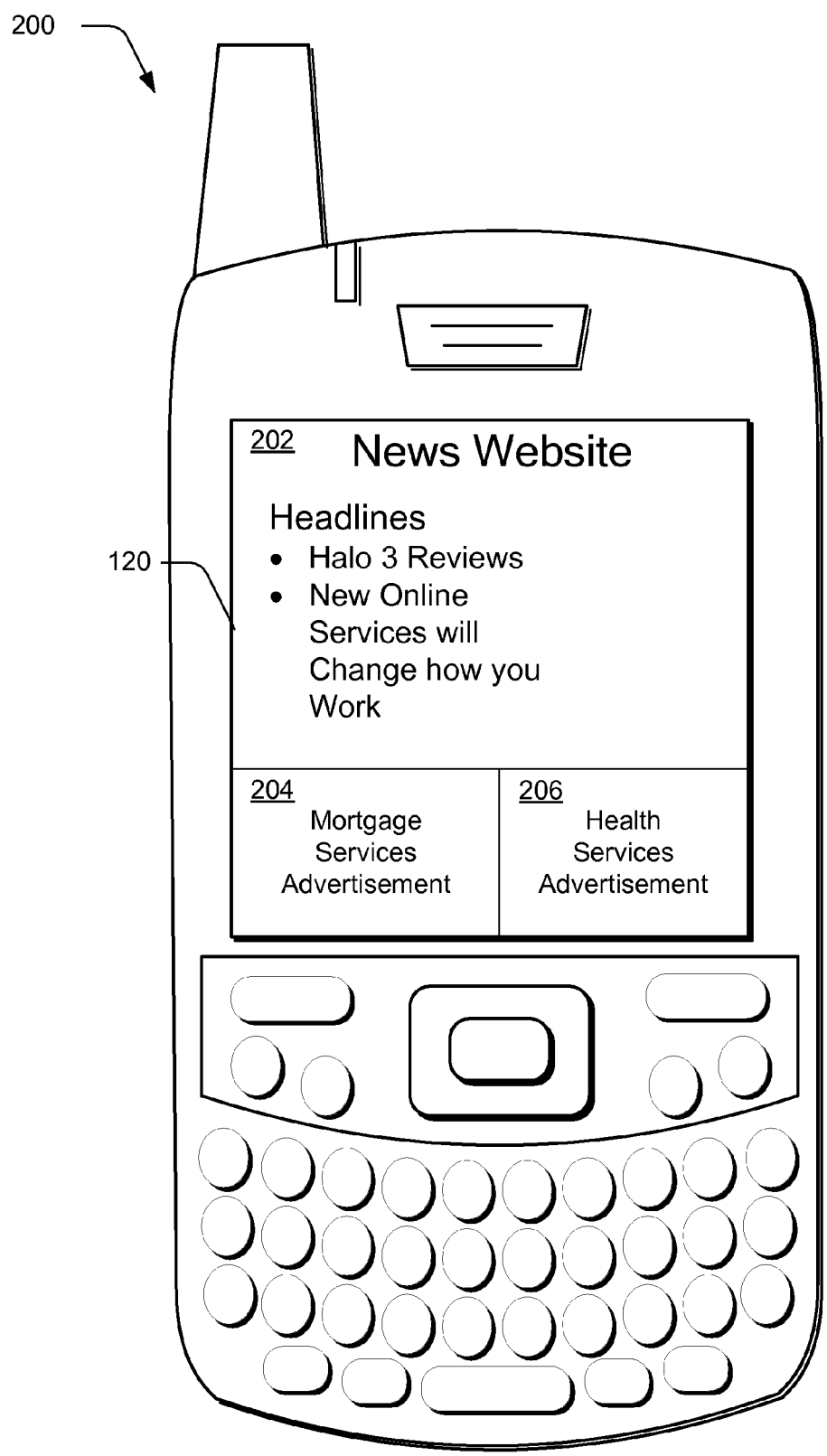
FIG. 2 is an illustration of an exemplary implementation showing a client of FIG. 1 in greater detail as outputting a webpage having content from a plurality of domains.

FIG. 2 depicts an exemplary implementation 200 of the client 104 of FIG. 1 as a client device configured for wireless mobile communication (e.g., a wireless phone) as displaying the webpage 120 of FIG. 1. The webpage 120 includes content 202 (which may or may not correspond to content 112(1)) from content provider 102(1) as well as content 204, 206 (which may or may not correspond to content 114(1)) from content provider 102(M).

As an example, content 202 is illustrated as news content having headlines and links to articles as generally provided by a news website. Accordingly, content provider 102(1) may be configured as a news website that is available via domain 118(1). Content 204, 206 is illustrated as advertisements as generally provided by an advertisement service. Accordingly, content provider 102(M) in this example may act as a third-party "ad server" which may provide advertisements to web pages of the content provider 102(1), as well as other content providers. Accordingly, the single webpage 120 in this example is made up of a concurrent display of content 202-206 that is obtained from a plurality of domains.

Returning back to FIG. 1, the client 104 may receive the webpage 120 having content 112(1), 114(1). The webpage 120 may be processed and configured for display (e.g., rendered) through implementation of functionality of the communication module 122, which is illustrated as being executed on processor 108 and is storable in memory 110. The communication module 122, for instance, may implement browser functionality to obtain the webpage 120 and cause it to be rendered by the client 104

The communication module 122 is also illustrated in the environment 100 of FIG. 1 as having a tracking module 124. The tracking module 124 is representative of techniques to track the domains 118(1)-118(M), from which, the client 104 receives content 112(1), 114(1) in the webpage 120. The tracking module 124, for instance, may determine that a "call" is to be made to the domains 118(1), 118(M) to obtain the content 112(1), 114(1) to be included in the webpage 120. The tracking module 124 may then assign a domain identifier 126(i) (where "i" may be an integer between one and "I") to each of the domains 118(1)-118(M) and increment a respective counter 128(i) each time content 112(c), 114(k) is received from the respective domains 118(1), 118(M). Thus, in this way the client 104, through the tracking module 124, may determine which domains 118(1)-118(M) are used to provide content, even when those domains are "third party" domains that supplement content provided by other domains, such as advertisements and so on.

The tracking may be used in a variety of ways by the client 104. For example, the tracking module 124 may output a notification to allow or block subsequent retrieval of content from particular domains. The notification, for instance, may identify particular domains and how content was received, e.g., through a third party relationship with one or many other domains. In the previous example of FIG. 2, for instance, the client 104 may permit output of content from the news website but block content from the advertising service that is provided through the news website and also a sports website and so on. Thus, the client 104 may be readily informed as to the sources of content and consequently which of these sources may be tracking the client, e.g., such as to provide content through multiple websites. Further discussion of notifications may be found in relation to FIG. 3.

The tracking may also be utilized in conjunction with privacy policies. For example, the tracking module 124 as previously described is representative of functionality to determine domains 118(1)-118(M) from which content 112(c), 114(k) is received, even third-party domains. When a third party domain is encountered, the track module 124 may determine whether privacy practices of the domain 118(M) comply with a privacy policy, such as dissemination of personally identifiable information, browsing habits that are disseminated anonymously, and so on. Based on this determination, the client 104 may take a variety of actions, such as to block and/or allow subsequent content and even "trade" noncompliance for additional considerations (e.g., for access to particular functionality, payment of a fee to the client 104 to continue access, and so on), further discussion of which may be found in relation to FIG. 4.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the webpage domain monitoring techniques described below are platform-independent, meaning that the techniques may be implemented on a variety of commercial computing platforms having a variety of processors.

Exemplary Procedures

The following discussion describes webpage domain monitoring techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the implementation 200 of FIG. 2.

Figure 3:
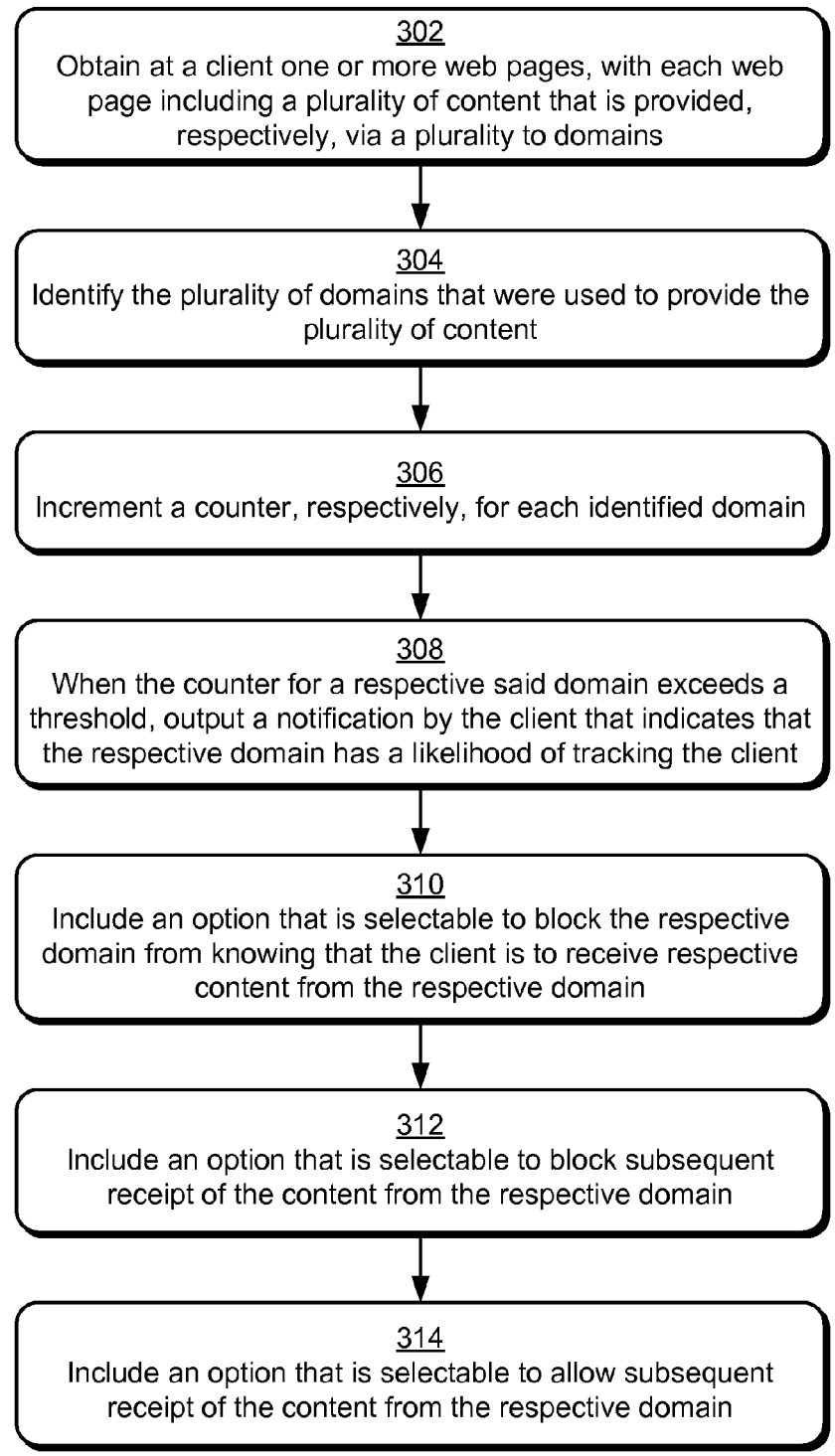
FIG. 3 is a flow diagram depicting a procedure in an exemplary implementation in which domains are tracked, which are used to provide content to one or more web pages and the tracking used to output a notification at a client indicating a likelihood that the client is tracked by one or more of the domains.

FIG. 3 depicts a procedure 300 in an exemplary implementation in which domains are tracked, which are used to provide content to one or more web pages and the tracking used to output a notification at a client indicating a likelihood that the client is tracked by one or more of the domains.

One or more web pages are obtained at a client, with at least one webpage including a plurality of content that is provided, respectively, via a plurality of domains (block 302). Webpage 120, for instance, includes content 112(1) received from content provider 102(1) via domain 118(1) and content 114(1) from content provider 102(M) via domain 118(M).

The plurality of domains that were used to provide the plurality of content is identified (block 304). The tracking module 124, for instance, may track "calls" to the different domains 118(1)-118(M) to obtain content, check "links" contained within the webpage 120 and/or the content 112(1), 114(1) itself to determine an origin of the respective content 112(1), 114(1), and so on.

A counter is incremented, respectively, for each identified domain (block 306). The client 104, for instance, may maintain a counter for each domain that is "visited" by the client 104, i.e., is used to provide content to the client 104. Each time particular ones of the domains are revisited, counters that correspond to the domains may be incremented. Thus, a third-party that is used to provide content for concurrent output with content from a variety of different websites may also be tracked.

When the counter for a respective domain exceeds a threshold, a notification is output by the client that indicates that the respective domain has a likelihood of tracking the client (block 308). The threshold, for instance, may be set in a variety of ways, such as a number obtain through "machine learning" or other techniques, as a relative number that is based on a plurality of the counters overall (e.g., when a particular counter exceeds a set portion of the overall total that includes each of the counters), and so on.

The notification may also be configured in a variety of ways. For example, the notification may indicate that name of the particular domain (e.g., "www.secondcontentprovider.com" and also a number of other domains, with which, content from that domain has been displayed, thus indicating an increased likelihood that the second content provider is a "third party" provider. The consideration of whether the domain is like a domain of a "third party" provider may also be used in the determination of whether to output the notification.

In another example, the notification may include an option that is selectable to block the respective domain from knowing that the client is to receive respective content from the respective domain (block 310). The client 104, for instance, may maintain a "blocked domain" list in memory 110 that is updated to include domains that were input through selection of the option. Therefore, when the client 104 is to obtain content from the domain subsequently (e.g., from a third party relationship), the subsequent retrieval of the content may be blocked (block 314), in some instances even before the request is made. In other instances, however, it may be desirable to include an option that is selectable to allow subsequent receipt of the content from the respective domain (block 314), such as to permit continued retrieval of content from the "main" website, e.g., the news content of FIG. 2. A variety of other examples are also contemplated.

Figure 4:
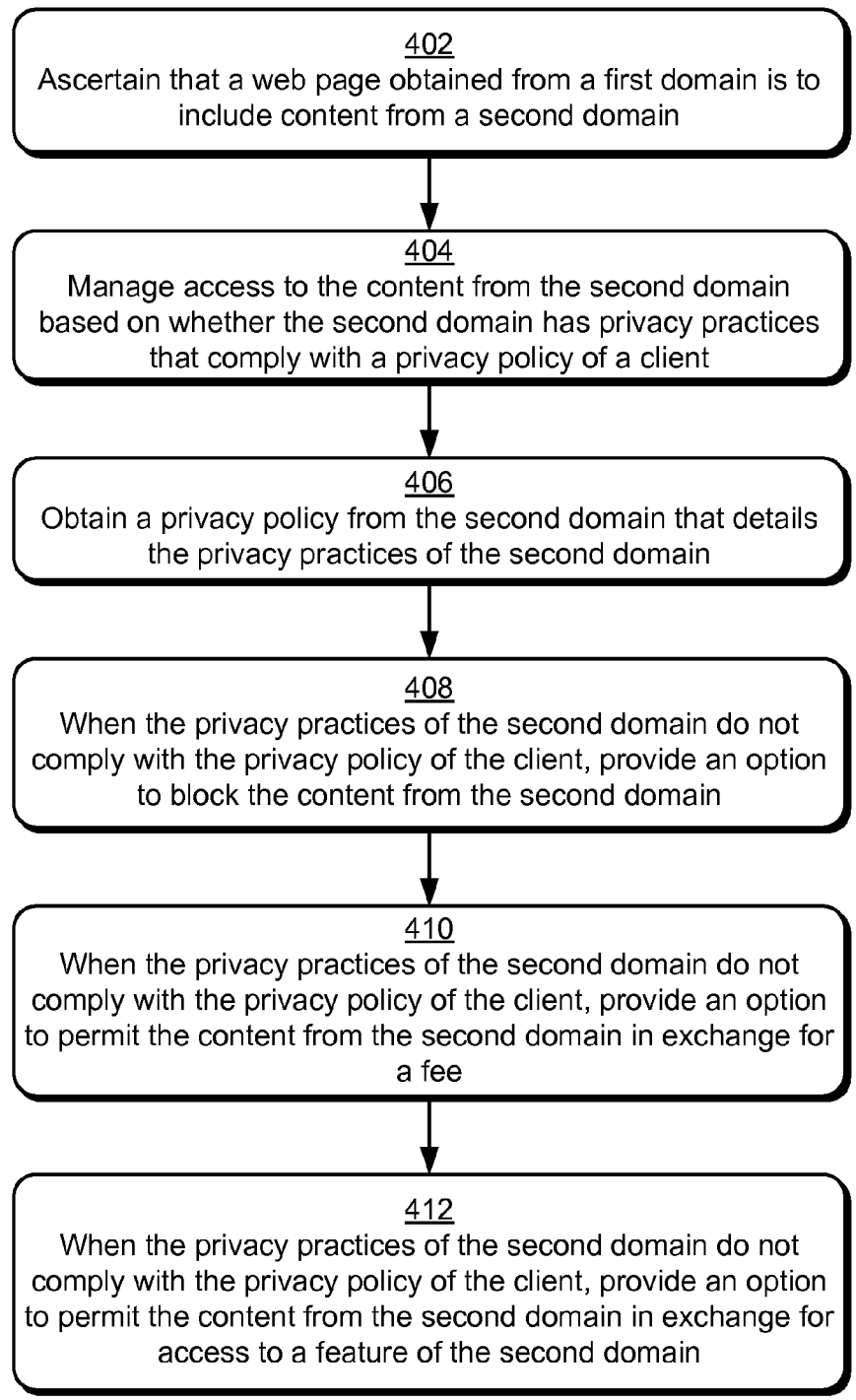
FIG. 4 is a flow diagram depicting a procedure in an exemplary implementation in which compliance of privacy practices of a particular domain with a privacy policy of a client are utilized to manage access to the particular domain.

FIG. 4 depicts a procedure 400 in an exemplary in which compliance privacy practices of a particular domain are compared with a privacy policy of a client to manage access to the particular domain. A web page obtained form a first domain is ascertained to include content from a second domain (block 402). The web page 120 of FIG. 2, for instance, to be received from the news website may be configured to include advertisements from an advertisement service, receive feeds of headlines from other news organizations (e.g., a weather service to provide up-to-date and localized weather information), and so on.

Access to the content from the second domain is managed based on whether the second domain has privacy practices that comply with a privacy policy of a client (block 404). The client 104, for instance, may maintain a privacy policy 130 in memory 110 local to the client 104. The privacy policy 130 may detail privacy practices that are permissible and/or impermissible, such as sharing of information that is personally identifiable, sharing of information that is not personally identifiable, and so on. In another instance 104, the tracking module 124 may observe the privacy practices of the website itself, such as what information is obtained from the client 104 and so on.

Continuing with the first example, a privacy policy may be obtained from the second domain that details the privacy practices of the second domain (block 406). The privacy policy of the second domain, for instance, may be stored at an extension to the network address of the second domain, e.g., "www.seconddomain.com/privacy_practices.xml". Therefore, the client may add this extension (e.g., "privacy_practices.xml") to the domain (e.g., "www.seconddomain.com") to obtain the privacy practices from a "known" location. In another example, the privacy practices may be accessible in a central repository accessible via the Internet that is kept "up-to-date" by the central repository and/or the websites themselves. A variety of other examples are also contemplated.

A variety of options may be implemented based on compliance with the privacy policy 130. For example, when the privacy practices of the second domain do not comply with the privacy policy of the client an option may be provided to block the content from the second domain (block 408).

In another example, when the privacy practices of the second domain do not comply with the privacy policy of the client, an option may be provided to permit the content from the second domain in exchange for a fee (block 410). For example, the user may not wish their browsing history to be made public, even if it is anonymous. However, a fee may be paid (e.g., a credit redeemable at the website, a cash payment, and so on), a user may be willing to forgo the privacy concerns.

In a further example, when the privacy practices of the second domain do not comply with the privacy policy of the client, an option may be provided to permit the content from the second domain in exchange for access to a feature of the second domain (block 412). The feature in this example is generally not provided to users that access the website, but rather is offered to those users that expressed privacy concerns, such as to make personally identifiable information anonymous, provide a larger amount of storage space for picture in a "spaces" website, and so on. A variety of other examples are also contemplated without departing from the spirit and scope thereof.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
    obtaining at a client a first web page including a first plurality of content that is provided, respectively, via a first plurality of domains;
    displaying the first web page at the client;
    tracking calls initiated from the first plurality of content in the first web page and checking links contained within the first plurality of content in the first web page, by the client, to identify the first plurality of domains used to provide the first plurality of content of the first web page;
    incrementing, by the client, a counter for each identified said domain, respectively used to provide the first plurality of content of the first web page;
    obtaining at the client a second web page including a second plurality of content that is provided, respectively, via a second plurality of domains;
    tracking calls initiated from the second plurality of content in the second web page and checking links contained within the second plurality of content in the second web page, by the client, to identify the second plurality of domains used to provide the second plurality of content to the second web page;
    incrementing, by the client, a counter for each identified said domain, respectively, used to provide the second plurality of content of the second web page; and
    when a counter for a respective said domain indicates, relative to a counter for at least one different said domain, that the respective said domain has a likelihood of tracking the client, displaying a notification at the client that indicates that the respective said domain has a likelihood of tracking the client and how the respective said domain provided the content.

2. A method as described in claim 1, wherein the notification includes an option that is selectable to block the respective said domain from knowing that the client is to receive respective said content from the respective said domain.

3. A method as described in claim 1, wherein each said domain is configured in accordance with Uniform Resource Locator (URL) techniques.

4. A method as described in claim 1, wherein the notification includes an option that is selectable to block subsequent receipt of the content from the respective said domain, and the option when selected, causes the respective said domain to be included in a blocked domain list.

5. A method as described in claim 1, wherein the notification includes an option that is selectable to allow subsequent receipt of the content from the respective said domain, and the option when selected, causes the respective said domain to be included in an allowed domain list.

6. A method as described in claim 1, wherein the tracking of the client includes navigation by the client through said content received via a plurality of web sites.

7. A method as described in claim 1, wherein the notification includes a link to the respective said domain, identifying the respective said domain, to indicate that the respective said domain has a likelihood of tracking the client.

8. A method as described in claim 1, wherein the notification includes an indication that said content was received by respective said domain from at least one third-party domain to indicate how the respective said domain provided the content.

9. One or more computer-readable storage media comprising instructions that are stored thereon and are executable by a client device to:
    obtain at the client device a plurality of web pages that include content provided by one or more domains;
    display the plurality of web pages at the client device that include the content provided by the one or more domains;
    track calls initiated from the content and check links contained within the content to monitor the one or more domains at the client device such that each of a plurality of said domains that are used to provide respective said content for display in a single said web page is identified;
    increment a counter for each identified said domain respectively;
    determine from the monitoring of the one or more domains that a particular said domain has a likelihood of tracking usage of the client device when the counter for the particular said domain exceeds a predetermined threshold relative to a total that includes counters for each of the identified said domains; and
        responsive to the determining, provide a notification at the client device indicating that the particular said domain has a likelihood of tracking the client device and how the particular said domain provided the respective said content to the plurality of web pages, the notification including an option to block subsequent retrieval by the client device of the respective said content from the particular said domain.

10. One or more computer-readable storage media as described in claim 9, wherein the instructions are further executable to determine that the particular said domain has the likelihood of tracking the usage based at least in part on a number of times that the client device that executes the instructions receives respective said content from respective said domains.

11. One or more computer-readable storage media as described in claim 9, wherein the instructions are executable to determine that the particular said domain has the likelihood of tracking the usage based at least in part on a number of web pages, from which, the client device that executes the instructions receives respective said content from respective said domains.

12. One or more computer-readable storage media as described in claim 9, wherein selection of the option causes the particular said domain to be included in a block list.

13. One or more computer-readable storage media as described in claim 9, wherein the instructions are further executable to provide an option to allow subsequent retrieval of the respective said content from the particular said domain.

14. One or more computer-readable storage media comprising instructions that are stored thereon and are executable by a client device to:
- display a single webpage including a plurality of content obtained at the client device;
- track calls initiated from the plurality of content and check links contained within the plurality of content to identify a plurality of domains used to provide the content to the single webpage at the client device;
- increment a counter at the client device for each identified said domain, respectively; and
- display a notification at the client device that indicates that a respective said domain has a likelihood of tracking the client device and how the respective said domain provided the content to the single web page if a percentage, which corresponds to the counter for the respective said domain relative to a total that includes the counter for each of the identified said domains, exceeds a predetermined threshold.

15. One or more computer-readable storage media as described in claim 14, wherein the notification includes an option that is selectable to block the respective said domain from knowing that the client device is to receive respective said content from the respective said domain.

16. One or more computer-readable storage media as described in claim 14, wherein the notification includes an option that is selectable to block subsequent receipt of the content from the respective said domain.

17. One or more computer-readable storage media as described in claim 14, wherein the notification includes an option that is selectable to allow subsequent receipt of the content from the respective said domain.

18. One or more computer-readable storage media as described in claim 14, wherein the tracking of the client device includes navigation by the client device through said content received via a plurality of websites.

19. One or more computer-readable storage media as described in claim 14, wherein the notification includes a link to the respective said domain to indicate that the respective said domain has a likelihood of tracking the client, the link identifying the respective said domain and identifying how the respective said domain provided the content to the single web page.

* * * * *